United States Patent
Niijima et al.

[19]

[11] Patent Number: 5,875,458
[45] Date of Patent: *Feb. 23, 1999

[54] DISK STORAGE DEVICE

[75] Inventors: Hideto Niijima; Seiji Munetoh; Hiroki Murata, all of Tokyo-to; Nobuaki Takahashi, Machida, all of Japan

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 847,837

[22] Filed: Apr. 28, 1997

Related U.S. Application Data

[63] Continuation of Ser. No. 491,014, Jun. 15, 1995, abandoned.

[30] Foreign Application Priority Data

Jun. 16, 1994 [JP] Japan .................................. 6-134686

[51] Int. Cl.$^6$ .............................. G06F 12/00; G06F 13/28
[52] U.S. Cl. ............................................ 711/114; 395/847
[58] Field of Search .................................. 711/112, 114, 711/4, 161–162; 395/182.04, 842–848, 200.42

[56] References Cited

U.S. PATENT DOCUMENTS

| | | | |
|---|---|---|---|
| 4,761,785 | 8/1988 | Clark et al. | 371/51 |
| 5,257,391 | 10/1993 | DuLac et al. | 395/830 |
| 5,345,565 | 9/1994 | Jibbe et al. | 395/310 |
| 5,359,468 | 10/1994 | Rhodes et al. | 360/48 |
| 5,367,669 | 11/1994 | Holland et al. | 395/182.05 |
| 5,412,668 | 5/1995 | Dewey | 371/40.1 |
| 5,469,566 | 11/1995 | Hohenstein et al. | 395/182.04 |
| 5,477,552 | 12/1995 | Nishiyama | 371/40.1 |

FOREIGN PATENT DOCUMENTS

| | | |
|---|---|---|
| 487901 A2 | 6/1992 | European Pat. Off. . |
| 1140326 | 6/1989 | Japan .................... G06F 3/06 |
| 2-162499 A | 6/1990 | Japan . |

OTHER PUBLICATIONS

Article "A Case for Redundant Arrays of Inexpensive Disks (RAID)", David A. Patterson, Garth Gibson, and Randy H. Katz, Computer Science Division, Department of Electrical Engineering and Computer Sciences, 571 Evans Hall, University of California, Berkeley, CA 94720, pp. 109–116, 1988.

X3T9.2 948D Working Draft, "Information technology—AT Attachment Interface with Extensions (ATA–2)", Revision 0, Sep. 1, 1993, pp. 1–83.

*Primary Examiner*—Kee M. Tung
*Attorney, Agent, or Firm*—Pryor A. Garnett

[57] ABSTRACT

A disk storage device includes two data buses 100, 200 for data transfer. Hard disks (HDDs) 0 and 1 are permanently connected to the data buses 100, 200, and hard disks 2 and 3 are selectively connectable to either of the data buses. When a microcontroller (MCU) 32 outputs a specified signal to a data path controller (DPC) 10 in response to a command from a host, multiplexers 20, 22 connect the selectively connectable hard disks 2 and 3 to one of the data buses. When data is written to or read from the hard disks, the write or read can be performed quickly with fewer data buses and a simple device configuration. A parity data generator (PGEN) 24 is connected to both of the buses, receiving new data via one bus and writing new parity data via the other bus.

12 Claims, 15 Drawing Sheets

DISK STORAGE DEVICE

This application is a continuation in part of application Ser. No. 08/491,014, filed Jun. 15, 1995 now abandoned.

DETAILED DESCRIPTION OF THE INVENTION

FIELD OF THE INVENTION

The present invention relates to a disk storage device and, more particularly, to a disk storage device that writes or reads data to or from a group of hard disks including at least one hard disk that can be selectively connected to one of two data buses for data transfer.

BACKGROUND OF THE INVENTION

As computers are downsized and network systems and multimedia communication are extensively disseminated, the quantity of data that a personal computer handles is being considerably increased. With the increase in a quantity of data, the processing capabilities of the hard disk and the protection of data are becoming the center of considerable attention.

Disk storage devices using a Redundant Array of Inexpensive Disks (RAID) system have been proposed in view of the above points. This RAID system is one which employs a plurality of hard disks (hereinafter referred to as HDDs) and realizes mass storage, high-speed processing, and protection of data. In the RAID system, there are six levels, RAID 0 to RAID 5, as shown in FIG. 15. In RAID 0, data (A to D) is divided to be recorded on a plurality of hard disks. In RAID 1, the same data is recorded on two HDDs. In RAID 2, data (A to D) is divided to be recorded on a plurality of HDDs and an HDD for ECC is employed. In RAID 3, data (A to D) is divided to be recorded on a plurality of HDDs and a single HDD for parity is employed. The parity is generated in units of word. In RAID 4, parities are generated at a unit of block. HDD for parity is determined in advance. In RAID 5, parities are distributed to all of the HDDs. In all of RAID 0 to RAID 5, a plurality of HDDs physically appears to be a single HDD logically.

In the disk storage device using RAID 5, in writing data, it is necessary to read data (old data) to be overwritten and original parity data (old parity data) out of the respective HDDs, and thereafter it is necessary to write new data and new parity data to the respective HDDs. That is, in order to write data corresponding to one sector, a data read operation and a data write operation are needed with respect to each of the two HDDs and therefore the input/output operations are needed 4 times.

On the one hand, in the RAID system with a single data bus, the processing speed of the data writing is slow and cannot be increased. If, on the other hand, there is a plurality of data buses, the number of times of data transfer can be apparently reduced to half. If the data transfer is one-sector writing, the number of HDDs that can be operated at a time would be limited to two even if there were three or more data buses. Therefore, data buses other than the two data buses with respect to the two HDDs being operated are not to be used. For this reason, even if a RAID system had three or more data buses, it would become identical in performance to a RAID system with two data buses.

Thus, two data buses are sufficient in a disk storage device using a RAID system, but there did not exist a disk storage device that employs a RAID system which is effectively operated with two data buses. Therefore, the disk storage device with a single data bus has the disadvantage that its processing speed is poor, and the disk storage device with three or more data buses has the disadvantage that data buses other than the data bus connected to a HDD being operated are unnecessary.

Incidentally, although a disk storage drive exists that uses a Small Computer System Interface (SCSI) (this drive will hereinafter be referred to a SCSI drive) and a disk storage drive with an AT Attachment (ATA) interface (this drive will hereinafter be referred to as an ATA drive), the ATA drive can be directly controlled by a microcontroller and therefore, in a construction having a small-scale HDD, the ATA drive is superior in several respects to the SCSI drive.

However, because a microcontroller must control the ATA drive directly, the load thereon becomes large. That is, since the microcontroller directly controls the timing adjustment of the ATA drive in each mode, the load on the microcontroller becomes large. In addition, when a microcontroller providing high-speed operation is employed, it is not possible from the standpoint of timing to access the ATA drive as a normal external memory-mapped device.

Further, in a disk storage device with a RAID system including an ATA interface, if too many interrupts are transferred through each HDD to the microcontroller, the operation processing requirement becomes a considerable load.

In view of the facts described above, an object of the present invention is to provide a disk storage device which is capable of writing data with a simple configuration and reading data quickly.

SUMMARY OF THE INVENTION

To achieve the above-described objects, the invention provides two data buses for data transfer, a group of hard disks including at least one hard disk that can selectively be connected to one of said data buses, and a control for selectively connecting the one hard disk to one of the data buses in response to a command from a host computer and providing control such that data is written to or read from each of the hard disks. The control selectively connects at least one hard disk of a group of hard disks to one of two data buses for data transfer in response to a command from a host computer and provides control such that data is written to or read from each hard disk of a group of hard disks. Thus, when data is written to or read from each hard disk of a group of hard disks, the writing or reading of data can be performed quickly with fewer data buses and the writing or reading of data can be performed with a simple configuration, because at least one hard disk of a group of hard disks is selectively connected to one of two data buses.

A preferred form of the invention permanently connects at least one hard disk to one or both of the data buses, and connects at least one other hard disk to one of said data buses selectively. When data is written to or read from a hard disk connected permanently to one of two data buses, the connection to the data buses is left as is because of the hard disk's permanent connection. When data is written to or read from at least one hard disk that can be selectively connected to one of the data buses, that hard disk is selectively connected to one of the data buses. The one hard disk that is connected permanently to one or both of the data buses does not require a construction such that a hard disk can be connected selectively to one of the data buses, so data can be written or read quickly with a simple configuration.

Other features and advantages of this invention will become apparent from the following detailed description of a typical embodiment thereof, taken in conjunction with the accompanying drawings.

DETAILED DESCRIPTION OF THE PREFERRED EMBODIMENTS

Figure 1:
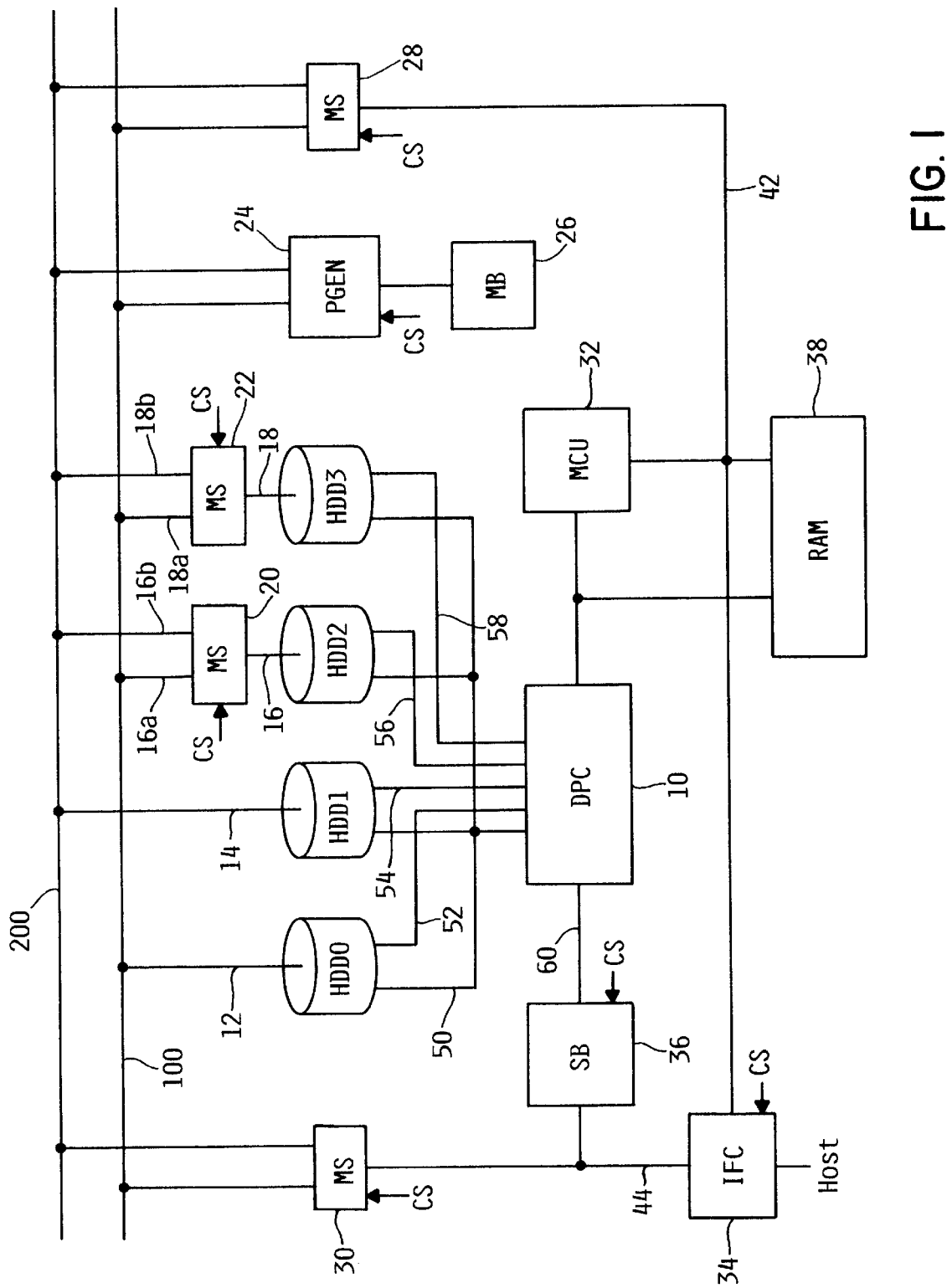
FIG. 1 is a block diagram schematically showing the configuration of an embodiment of the present invention.

An embodiment of the present invention will now be described in reference to the drawings. A disk storage device according to this embodiment uses the RAID level 5. This disk storage device, shown in FIG. 1, includes two data buses 100, 200 and four HDDs 0 to 3. HDD 0 is permanently connected through a data bus 12 to the data bus 100, and HDD 1 is permanently connected through a data bus 14 to the data bus 200. The HDDs 2 and 3 can be connected via data buses 16, 18 and multiplexers (hereinafter referred to as MSs) 20, 22 to either the one data bus 100 or the other data bus 200. Each of the HDDs 0 to 3 is connected to a data path controller (hereinafter referred to as a DPC) 10 through a control line (a select line, an address bus, and a read/write line (RJW line) comprising a read line (R line) and a write line (W line)). That is, each of the HDDs 0 to 3 shares a select line 50, which is connected to an input/output terminal of the DPC 10. Each of HDDs 0 to 3 also shares an address bus 60 connected to input/output terminals of the DPC 10. HDDs 0 to 3 are connected to the DPC 10 through R/W lines 52, 54, 56, and 58 for indicating reading (R) or writing (W).

A parity data generation device (hereinafter referred to as a PGEN) 24 is connected to the data buses 100 and 200, and a memory buffer (hereinafter referred to as an MB) 26 for holding parity data is connected to the PGEN 24. Note that a control signal for the MB 26 is generated by the PGEN 24.

A microcontroller (hereinafter referred to as an MCU) 32 and a sector buffer (hereinafter referred to as a SB) 36 are connected to the DPC 10. A host interface (SCSI interface) chip (hereinafter referred to as an IFC) 34 is connected to the SB 36. To the MCU 32 there is connected a RAM 38 which stores a control program of the MCU 32, and the RAM 38 is also connected to the DPC 10. A data bus 42 of the MCU 32 can be connected to the data bus 100 or 200 by switching an MS 28 and is also to the IFC 34. A data bus 44 of the IFC 34 can be connected to the data bus 100 or 200 by switching an MS 30.

Figure 2:
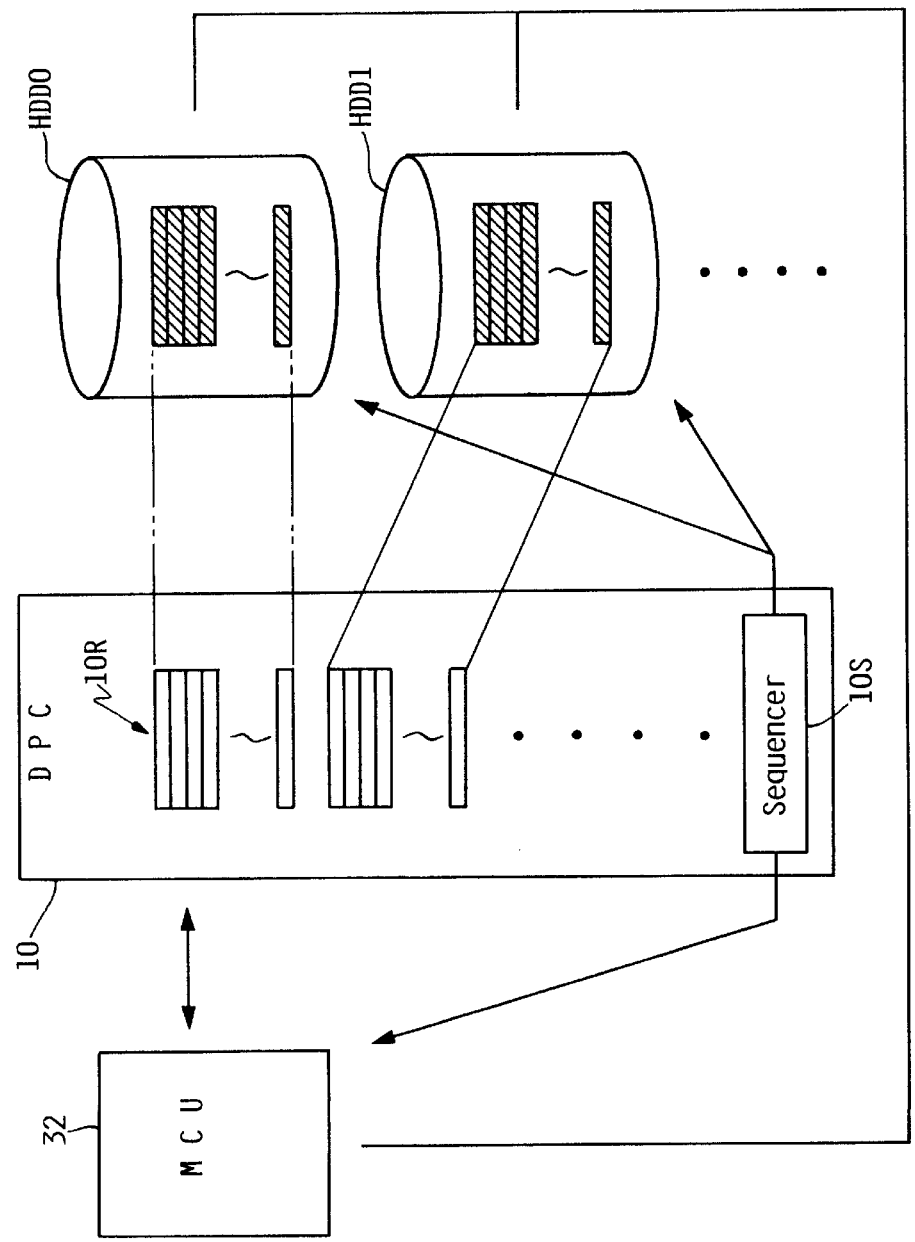
FIG. 2 is a schematic view showing the internal construction of the DPC.

The DPC 10, as shown in FIG. 2, comprises a plurality of registers 10R to which specified data is written by the MCU 32 and a control sequencer 10S for, for example, generating an interrupt request at the end of data transfer and producing a signal that is output to the MCU 32 to report the end of data transfer. If a signal from the MCU 32 is input to the DPC 10 and specified data is written to the register 10R, the DPC 10 will be set and output a specified control signal (hereinafter referred to as a CS) to the MS 20, the MS 22, the PGEN 24, the MS 28, the MS 30, the SB 36, and the IFC 34.

More particularly, in response to the input CS, the MS 20 and the MS 22 connect the data buses 16 and 18 of HDD 2 and HDD 3 with the data buses 16a and 18a connected to the data bus 100 or the data buses 16b and 18b connected to the data bus 200. The MS 28 connects the data bus 42 to the data bus 100 or the data bus 200 in response to the input CS. The MS 30 connects the data bus 44 with the data bus 100 or the data bus 200 in response to the input CS. The IFC 34 transfers data sent from a host in response to the input CS. The SB 36 holds or transfers the data sent from a host in response to the input CS. In response to the input CS, the PGEN 24 generates an exclusive OR (XOR) operation between the data transferred via the data bus 100 and the data transferred via the data bus 200 and writes this result to the MB 26. The PGEN 24 also generates an XOR operation between the data from the data bus 100 or 200 and the data written to the MB 26 and transfers this result to the data bus 200 or 100.

The MS 20, the MS 22, the MS 28, and the MS 30 will hereinafter be described. The MS 20, the MS 22, the MS 28, and the MS 30 are substantially the same in construction and therefore only the MS 28 will be described and a description of the others will be omitted.

Figure 3:
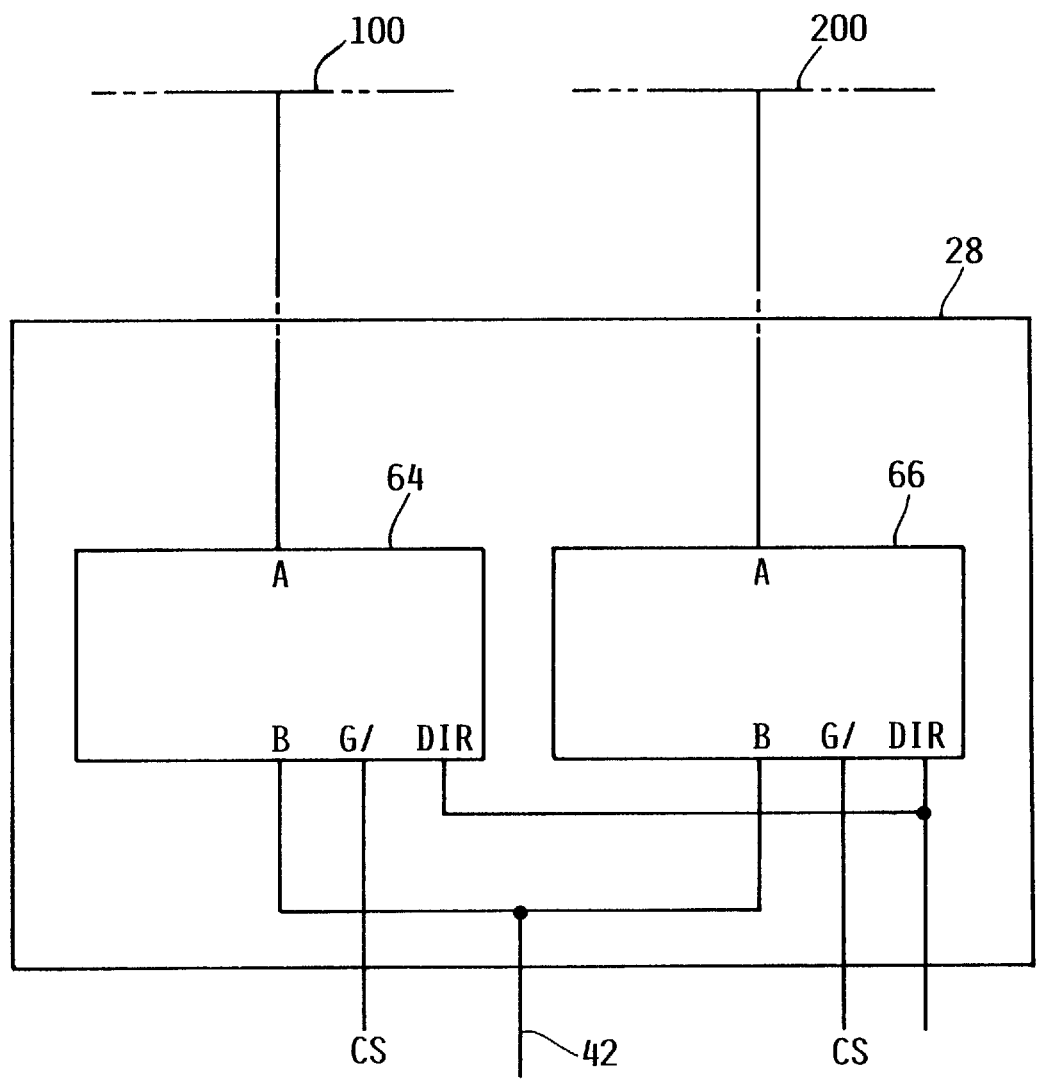
FIG. 3 is a schematic view showing the internal construction of the multiplexer.

The MS 28 includes two ICs 64 and 66, as shown in FIG. 3. The ICs 64 and 66 comprise, for example, a 74ACT16245. To an I/O terminal G/ of each of the ICs 64 and 66 there is input the CS from the DPC 10 through the CS line. To an I/O terminal DIR of each of the ICs 64 and 66 there is input a specified command. To an I/O terminal A of the IC 64 there is connected a data bus 100, to an I/O terminal A of the IC 66 there is connected a data bus 200, and to an I/O terminal B of each of the ICs 64 and 66 there is connected a data bus 42. The MS 28 thus constructed connects the data bus 42 with the data bus 100 or 200 in response the input CS signal.

Figure 4:
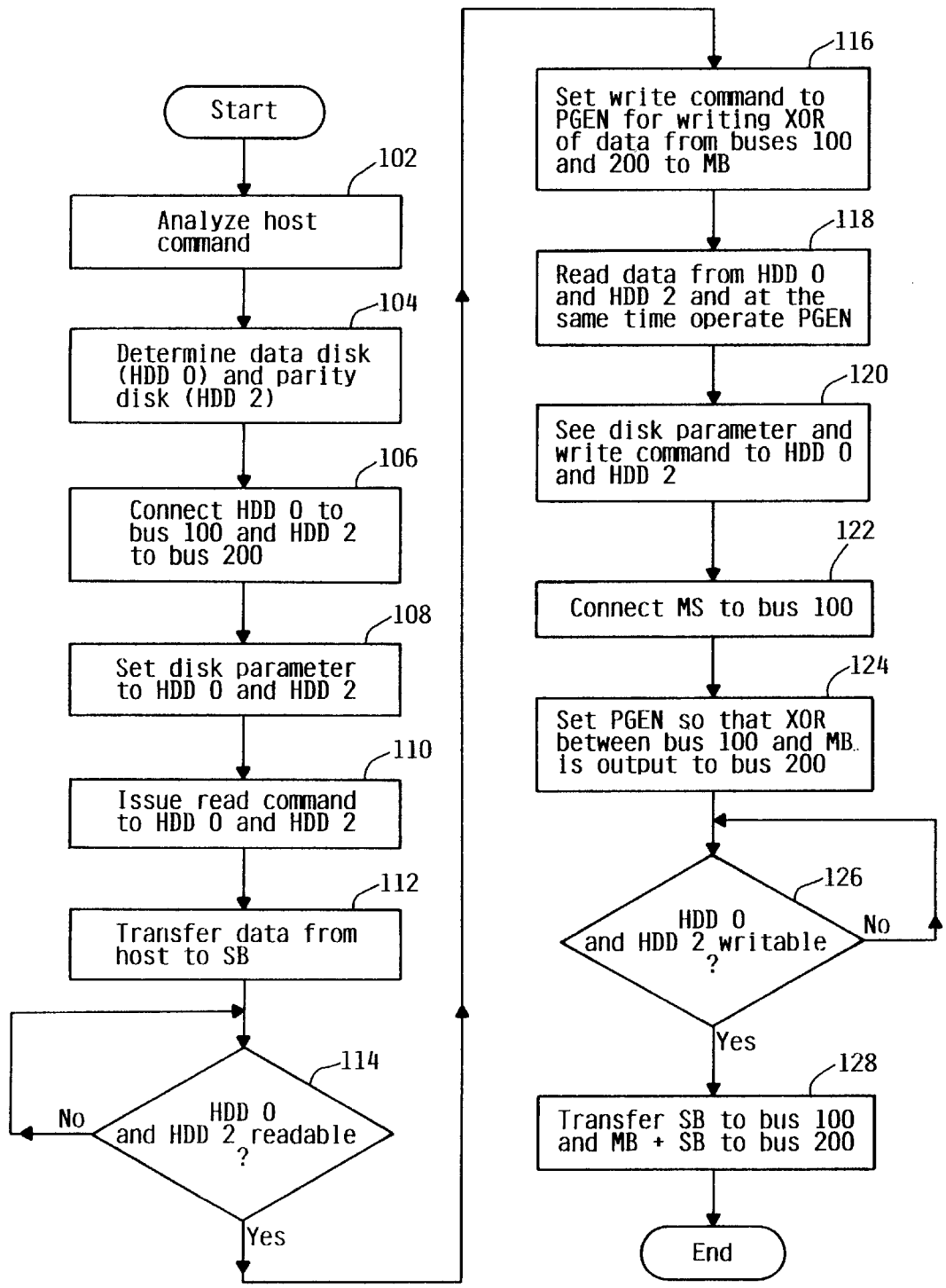
FIG. 4 is a flowchart showing the data write processing routine as TCQ is not used.

The operation of this embodiment will be described next. The write operation of data in a case where tagged command queuing (hereinafter referred to as TCQ) is not used will first be described in reference to FIGS. 4 to 6.

If the IFC 34 receives a command from the host when HDDs 0 to 3 and the IFC 34 are in a stand-by state, it will output a specified signal to the MCU 32. In response to the specified signal, the MCU 32 reads the command received by the IFC 34 and, in step 102 (FIG. 4), analyzes the command sent from the host. In step 104, the MCU 32 determines writing or reading of data, a data HDD to which data are written, and a parity HDD to which parity data are written, from the analysis result. In this embodiment, it is assumed that, as a result of the analysis of the command from the host, the command was determined as a data write command, HDD 0 as a data HDD, and HDD 2 as a parity HDD. A description will be made in reference to this example.

In step 106, the data bus 16 of HDD 2 and the data bus 16b connected to the data bus 200 are connected by outputting the CS to the MS 20 by means of the DPC 10. It is to be noted that, since HDD 0 is permanently connected to the data bus 100, it does not need the process in which the CS is output by the DPC 10.

In step 108 disk parameters to the HDDs 0 and 3 are set and, in step 110, read commands are issued for reading data from HDDs 0 and 2.

In step 112, the data from the host is held in the SB36 by outputting the CS to the SB 36 by means of the DPC 10.

In step 114, it is determined whether reading data out of HDDs 0 and 2 is possible or not. If reading data out of HDDs 0 and 2 is possible, step 114 will advance to step 116. In step 116, the PGEN 24 generates an XOR operation between data (old data) transferred via the data bus 100 and data (old parity data) transferred via the data bus 200, and issues to the MB 26 a command for writing this result (mask data). In step 118, data are read out of HDDs 0 and 2 and at the same time the PGEN 24 is operated.

More particularly, specified data for controlling the control bus and specified data for indicating the number of data (e.g., 512 bytes) for one sector to be transferred from HDDs 0 and 2 is first written to the register 10R of DPC 10. The DPC 10 then outputs the register addresses of the HDDs 0 and 2 to be accessed to the address bus 60, and makes the select bus 50 active and also makes the R/W line 52 of the HDD 0 and the R/W line 56 of HDD 2 active.

Figure 5:
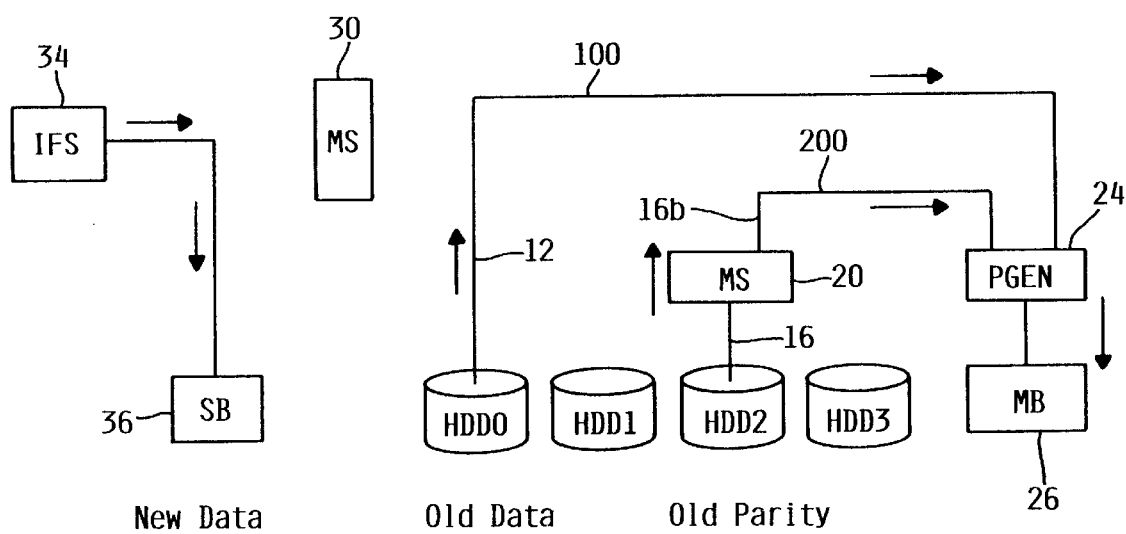
FIG. 5 is a block diagram showing each data transfer path in a case where old data and old parity data is read to write data.

Commands for data transfer (from HDDs 0 and 2) are then output to the DPC 10. Upon this occurrence, data is output from HDDs 0 and 2 through data buses 100 and 200 to the PGEN 24, as shown in FIG. 5. The PGEN 24 to which the data is output through HDDs 0 and 2 from HDDs 0 and 2, generates an XOR operation between the old data from HDD 0 and the old parity data from HDD 2 and writes this result to the MB 26.

In step 120, disk parameters are set to HDDs 0 and 2, and write commands are issued to HDDs 0 and 2.

Figure 6:
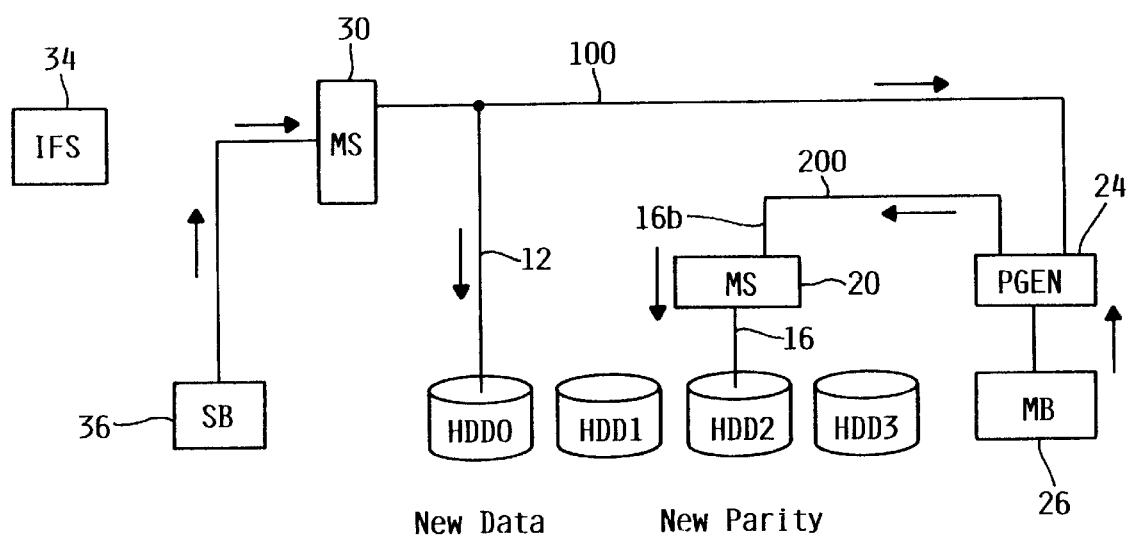
FIG. 6 is a block diagram showing transfer paths of new data and new parity data.

In step 122, the MS 30 connects the data bus 100 and the SB 36 (FIG. 6) by outputting the CS to the MS 30 by means of the DPC 10. In step 124, the PGEN 24 produces new parity data by outputting the CS to the PGEN 24 by means of the DPC 10. In step 126, it is determined whether HDDs 0 and 2 can be written to or not. If HDDs 0 and 2 can be written to, step 126 will advance to step 128. In step 128, the new data transferred from the host and held in the SB 36 is transferred through the MS 30 to HDD 0, and a second XOR value which is the result of the XOR between that new data and a first XOR value (between the old data and the old parity data), is transferred through MS 20 to HDD 2 (FIG. 6). Upon this occurrence, new data is written to HDD 0 and new parity data to HDD 2.

In this way, the four steps required in the prior art for writing data can be reduced to two steps by switching the connection of the data bus of the HDD with the two data buses 100 and 200, and the data transfer can be performed quickly with the minimum necessary number of data buses.

In addition, each of HDDs 0 to 3 shares a single selector bus 50 which is connected to a single I/O terminal of the DPC 10. Therefore, the number of I/O terminals of the DPC 10 can be reduced and the construction of the disk storage device made simple.

The data read operation (without TCQ) will be described next. In the following description, the operation of each construction element will not be described because it is performed by outputting a specified CS in accordance with the indication of the MCU 32 by the DPC 10.

Figure 7:
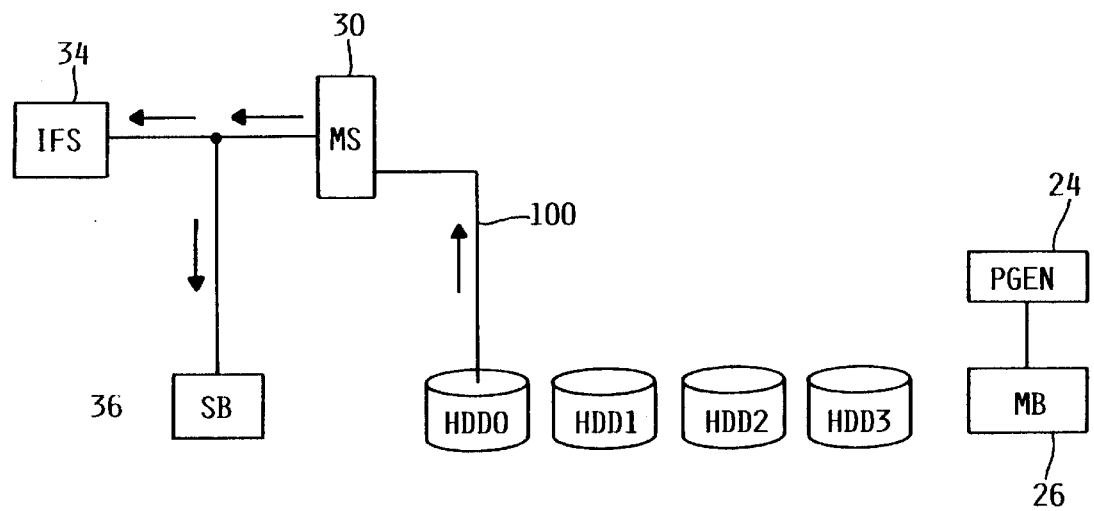
FIG. 7 is a block diagram showing a data transfer path as data is read out.

The data read operation is the same as a normal read operation. However, it is necessary to provide the MS 30 on a path into which data come, as shown in FIG. 7. More particularly, for example, when data is read out of HDD 0, it is necessary that the DPC 10 be set and the MS 30 connects the data bus 100 connected to the data bus 12 of HDD 0 and the data bus 44.

Figure 8:
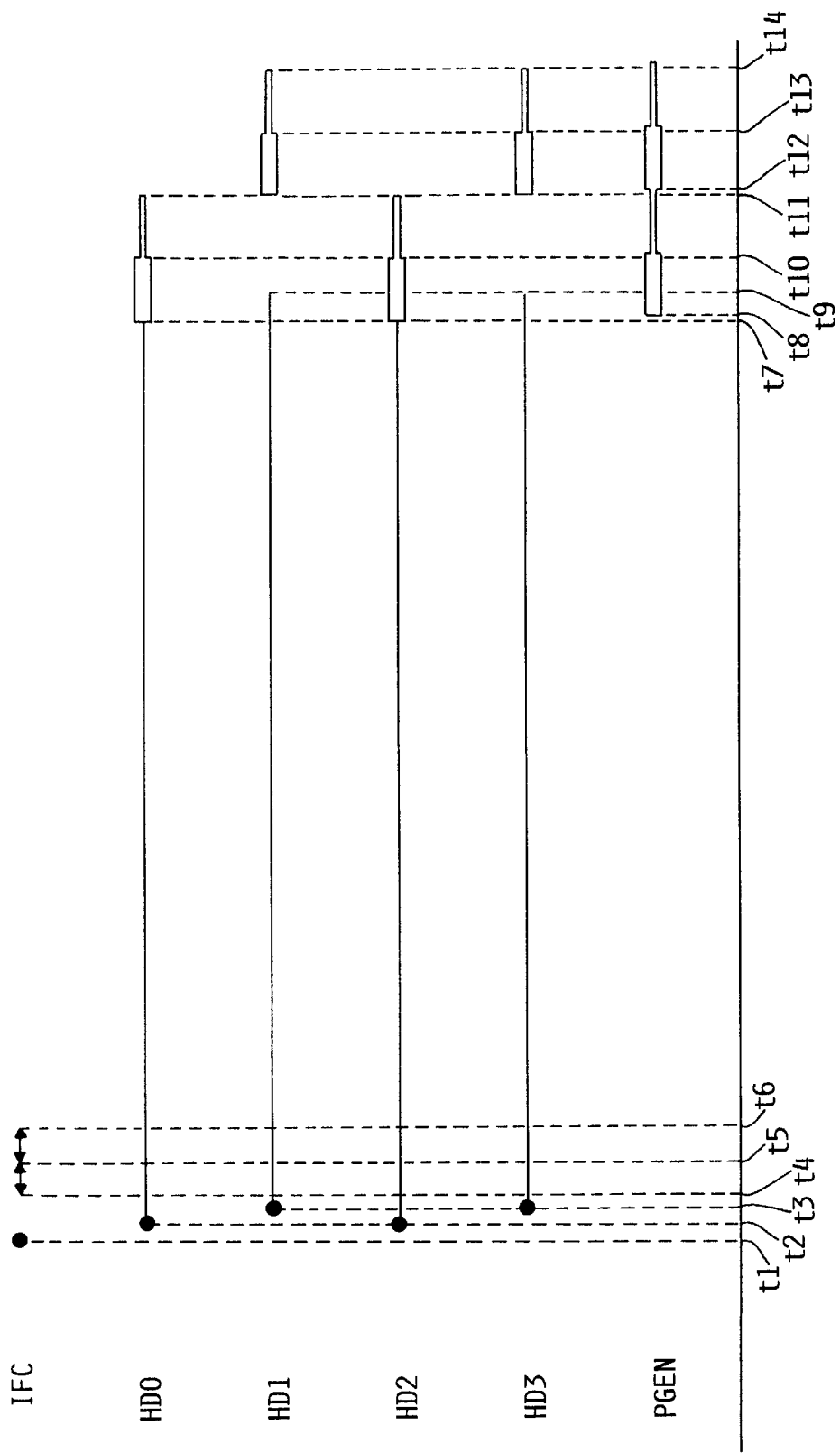
FIG. 8 is a timing chart showing the data write processing routine as TCQ is not used.

The data write operation (in a case using TCQ) will be described next in reference to the timing chart shown in FIG. 8.

This write operation is substantially the same as the case where the TCQ is not used. However, when a plurality of commands exists in the TCQ, the commands after the first command perform the subsequent processes (a) to (j) by making use of the seek and rotational delay time of the HDD which has received the first command. Assume now that, in the first write command (command 1) on the queue by the TCQ, HDDs 0 and 2 are the HDD to which data is written, and in the second write command (command 2) HDDs 1 and 3 are the HDD to which data are written.

In a case (time t1) that, when HDDs 0 to 3 and the IFC 34 are in a stand-by state, the IFC 34 receives the commands 1 and 2 from the host, the IFC 34 outputs a specified signal to the MCU 32. The MCU 32 to which that signal was input reads the commands 1, 2 and:

a. Issues a read command to the HDDs 0 and 2 (time t2).

b. Issues a read command to the HDDs 1 and 3 (time t3).

c. Writes the data with respect to the command 1 from the host through the IFC 34 to the SB 36 (time t4 to time t5). Note that the data is regarded as data SB 36-1.

d. Writes the data with respect to the command 2 from the host through the IFC 34 to the SB 36 (time t5 to time t6). Note that the data is regarded as data SB36-2.

e. Starts transferring data from HDDs 0 and 1 at time t7 after the elapse of the seek rotation time (time t2 to time t7) and produces mask data (time t8 to time t10) by PGEN 24 at time t8. The mask data is held on MB 26. (This data is regarded as MB26-1.)

f. Issues a write command to HDDs 0 and 2.

g. Starts transferring data from HDDs 1 and 3 at time 11 after the elapse of the seek rotation time (time t3 to time t9) and produces mask data at time t12 by PGEN 24 (time t12 to time t13). The mask data is held on MB 26. (This data is regarded as MB26-2.)

h. Issues a write command to HDDs 1 and 3.

i. Uses data SB36-1 and data MB26-1 and writes new data and new parity data to HDDs 0 and 2, respectively, using the above-described method using no TCQ (time t10 to time t11).

j. Uses data SB36-2 and data MB36-2 and writes new data and new parity data to HDDs 1 and 3, respectively, using the above-described method using no TCQ (time t13 to time t14).

The time required for above processes is typically as follows: The command issue time (processes (a), (b), (f), (h)) is 1 μs. The host data transfer time (processes (C), (D)) is 25 μs. The HDD data transfer time (processes (e), (g), (i), (j)) is 50 μs. The seek and rotational delay time of the HDD is 5000 μs.

Thus, the TCQ can also be effectively handled by making good use of the seek and rotational delay time. In fact, since many expensive systems with a number of data buses have only one parity generator (corresponding to the PGEN 24 of this embodiment), this becomes a bottleneck, so they become identical in performance to the construction of this embodiment. It is to be noted that the above-described process order is merely an instance. For example, if the seek and rotational delay time of HDDs 1 and 3 is ended earlier than that of the HDDs 0 and 2, the processes with respect to HDDs 1 and 3 will be executed first.

In this way, in the case using the TCQ, 8 steps required in the prior art in the case where two commands are used simultaneously to write data for one sector to two HDDs, can also be reduced to 4 steps by switching the connection of the HDD with the two data buses 100 and 200, and the data transfer can be performed quickly with the minimum necessary number of data buses.

The data read operation (in the case using TCQ) will be described next. As with the above-described write operation (in the case using the TCQ), when a plurality of commands exists in the TCQ, the commands after the first command perform processes (a) to (d) by making use of the seek and rotational delay time of the HDD which has received the first command. Assume now that the HDD which the first read command on the queue by the TCQ uses is HDD 0 and the HDD which the second read command uses is HDD 2. At this time, a. Issues a read command to HDD 0.
b. Issues a read command to HDD 2.
c. Transfers the data of HDD 0 to the host.
d. Transfers the data of HDD 2 to the host.

As with the above-described write operation (in the case using the TCQ), the TCQ can also be effectively handled by making good use of the seek and rotational delay time. In fact, in expensive systems with a number of data buses, the transfer speed to the host becomes a bottleneck, so they become identical in performance with the construction of this embodiment.

Figure 9:
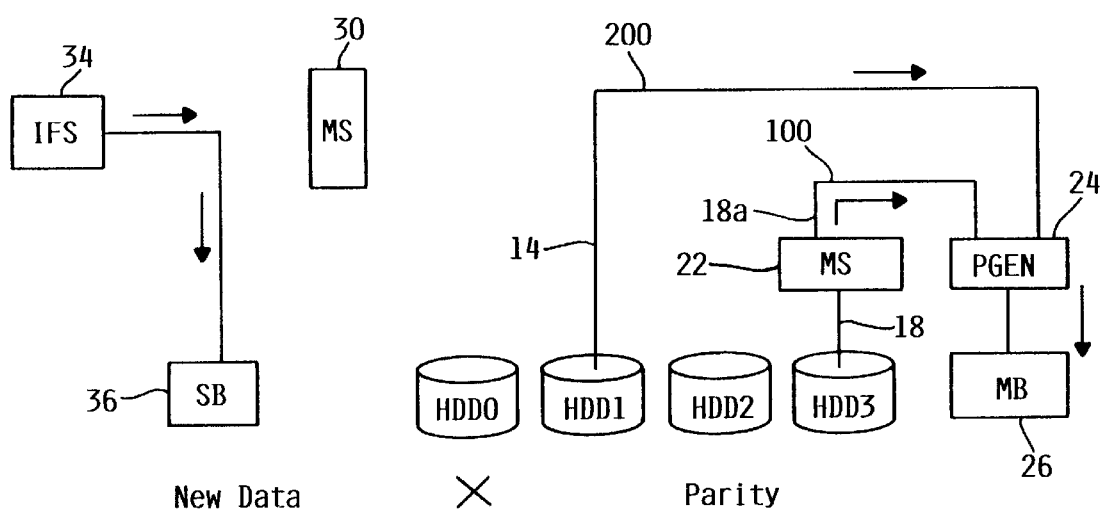
FIG. 9 is a block diagram showing each data transfer path in a case where data for writing data is read when a defective HDD exists.
Figure 10:
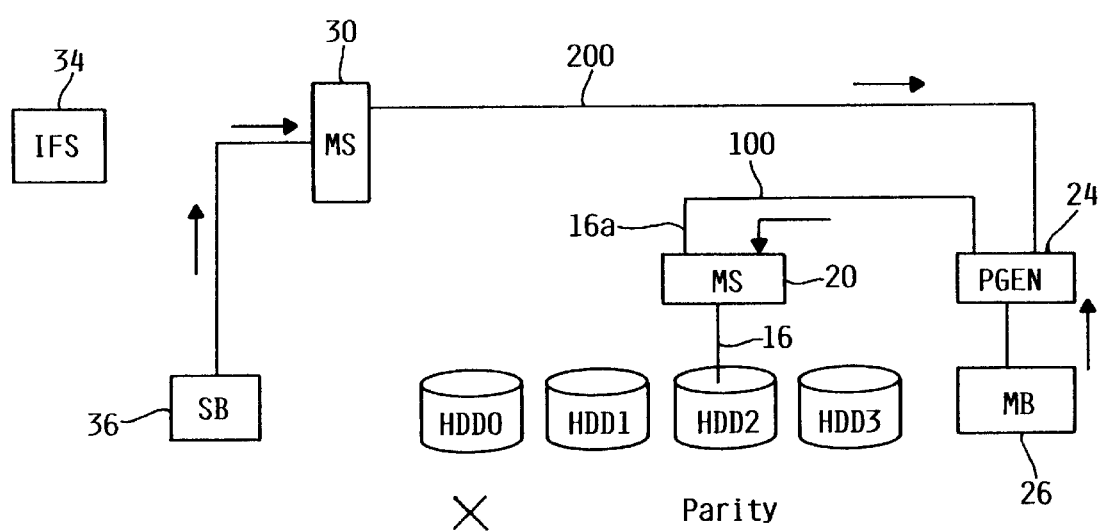
FIG. 10 is a block diagram showing transfer paths of new data and new parity data.

A write operation in a case where a defective HDD exists will be described next. Assume now that HDDs 0 and 2 are a data HDD and a parity HDD, respectively, and HDD 0 is a defective HDD, as shown in FIGS. 9 and 10.

a. As shown in FIG. 9, reads data out of the HDDs 1 and 3, calculates the XOR between the data from the HDD 1 and the data from the HDD 3 by means of PGEN 24, and holds this result (mask data) to the MB 26.
b. At the same time with the process (a), stores the data from the host in the SB 36.
c. As shown in FIG. 10, calculates the XOR between the data (new data) of the SB 36 and the data (mask data) of the MB 26 and writes this result (parity data) to HDD 2 using an on-the-fly method.

Thus, the write operation becomes possible even in a case where a defective HDD exists by switching the connection of the HDD with two data buses and data transfer can be performed quickly with the minimum necessary number of data buses.

Figure 11:
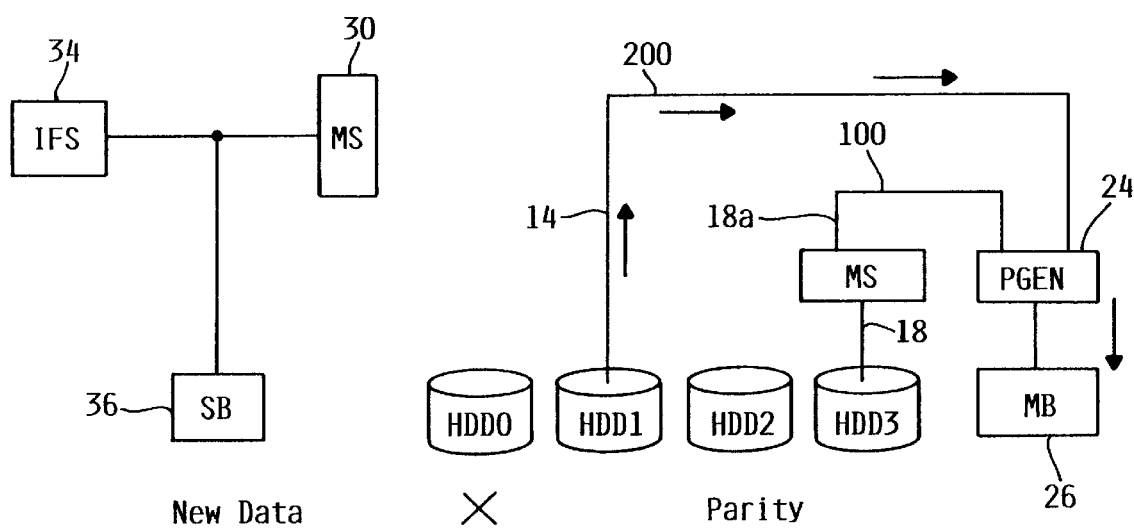
FIG. 11 is a block diagram showing each data transfer path in a case where data is read when a defective HDD exists.
Figure 12:
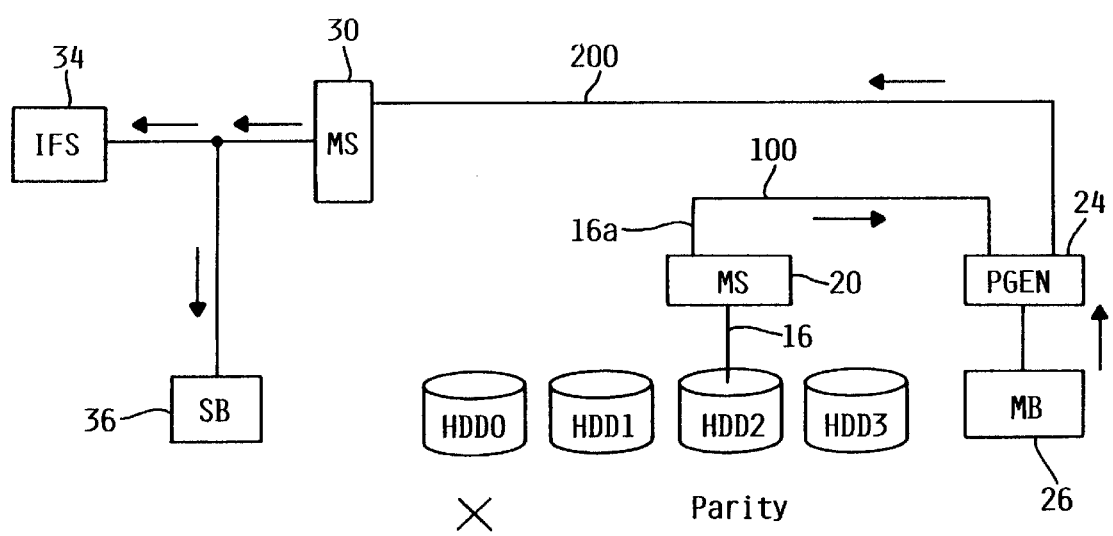
FIG. 12 is a block diagram showing each data transfer path in a case where data is read when a defective HDD exists.

A read operation in a case where a defective HDD exists will be described next. Assume now that HDDs 0 and 2 are a data HDD and a parity HDD, respectively, and HDD 0 is a defective HDD, as shown in FIGS. 11 and 12.

a. As shown in FIG. 11, reads data out of HDDs 1 and 3, calculate the XOR between the data from HDD 1 and the data from the HDD 3 by means of PGEN 24, and holds this result (mask data) to the MB 26.
b. As shown in FIG. 12, calculates the XOR between the data (parity data) of HDD 2 and the data (mask data) of the MB26. Therefore, the data of HDD 0 is taken out and sent to the host using an on-the-fly method.

Thus, the read operation becomes possible even in the case where a defective HDD exists by switching the connection of the HDD with two data buses and data transfer can be performed quickly with the minimum necessary number of data buses.

It is to be noted that the read order and the combination of HDD 1, HDD 2, and HDD 3 are arbitrary.

Figure 13:
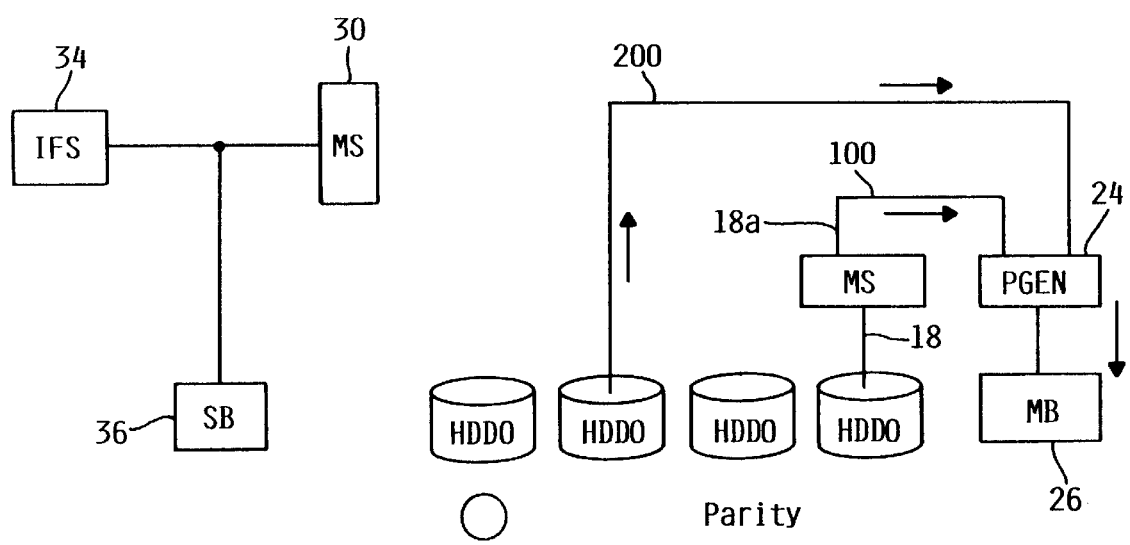
FIG. 13 is a block diagram showing each data transfer path in a case where data is written to a recovered HDD.
Figure 14:
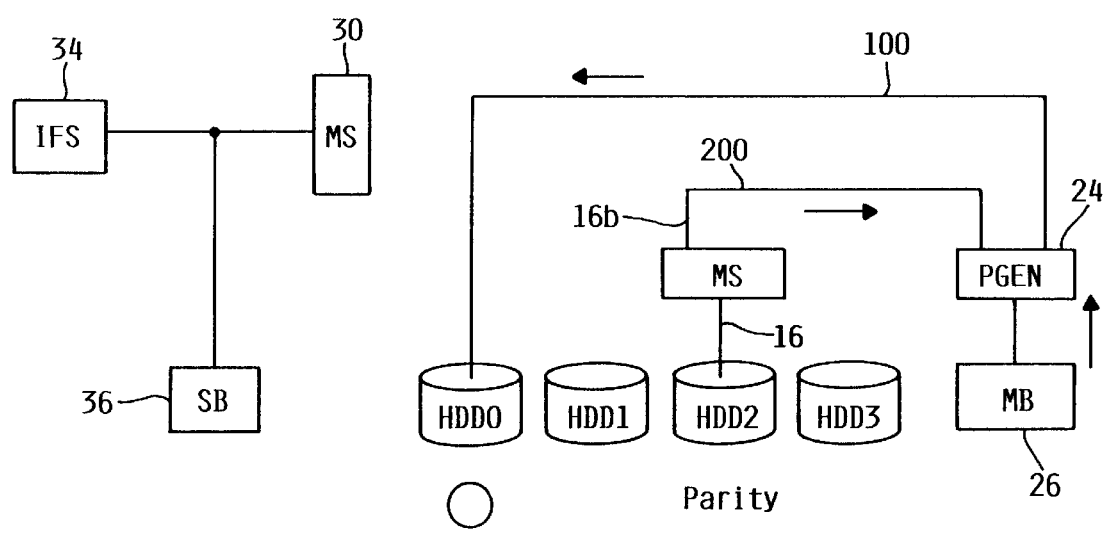
FIG. 14 is a block diagram showing each data transfer path in a case where data is written to a recovered HDD.
Figure 15:
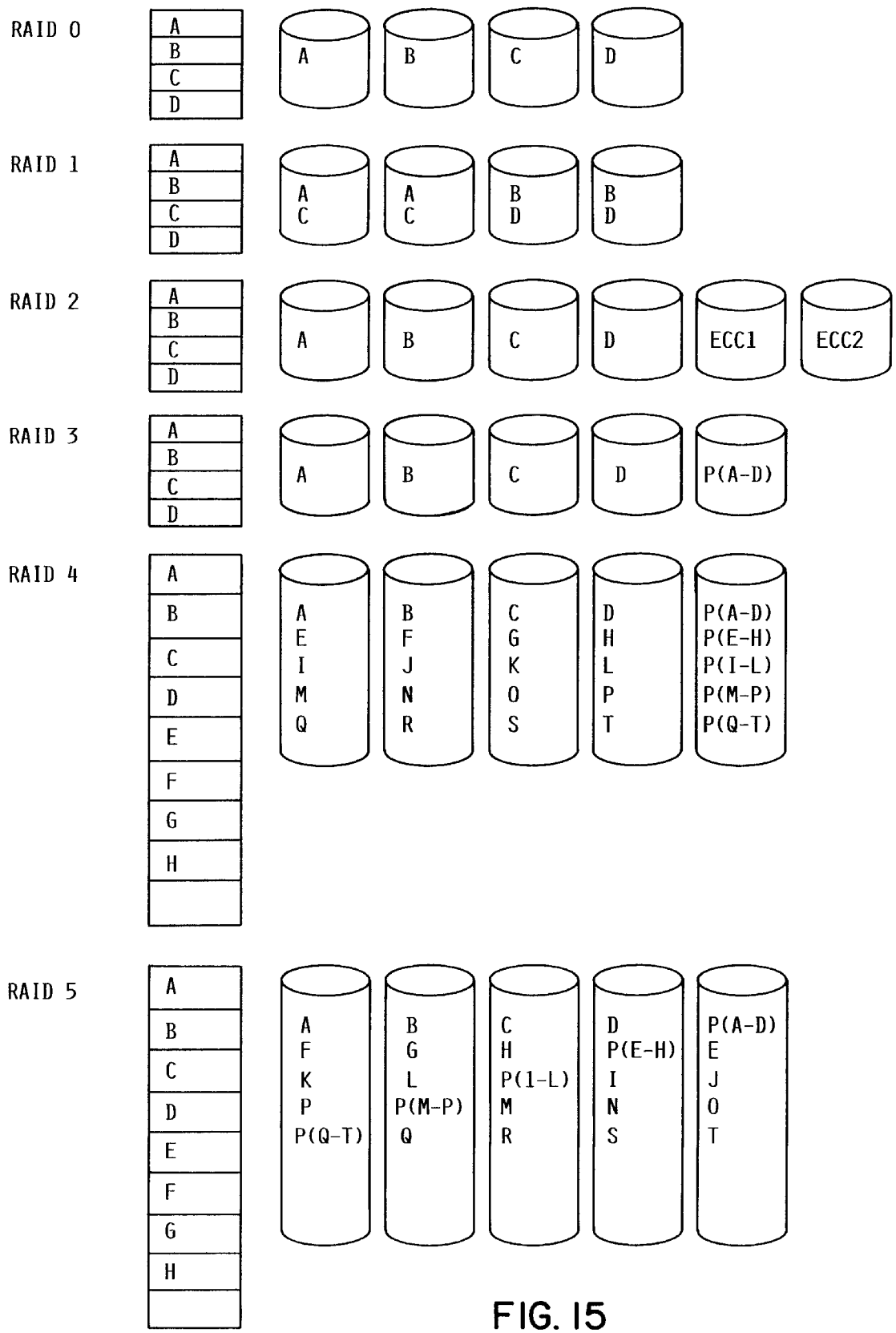
FIG. 15 is a schematic view showing a RAID system.

Recovery processing for defective disks will be described next. Assume now that HDD 0 has been exchanged, as shown in FIGS. 13 and 14.

a. As shown in FIG. 13, reads data out of HDDs 1 and 3, calculates the XOR between the data from HDD 1 and the data from HDD 3 by means of PGEN 24, and holds this result (mask data) to the MB 26.
b. As shown in FIG. 14, calculates the XOR between the data (parity data) of HDD 2 and the data (mask data) of the MB 26. Therefore, the data of HDD 0 is taken out and written to HDD 0 using an on-the-fly method.

Note that the read order and the combination of HDD 1, HDD 2, and HDD 3 are arbitrary. Also, in the process (b), HDD 0 is for the write operation and HDD 2 is for the read operation, and the DPC 10 requires a function of making the W bus active with respect to HDD 0 and making the R line active with respect to HDD 2.

While the above-described embodiment has been described with reference to the disk storage device using the RAID level 5, it is not limited to this but may also be applied to other levels of RAID. For example, the read/write operation of RAID 0 and 3 will be described next. In RAID 0, there is required an operational performance with respect to a large amount of data. In this construction, 20 MB/s of FAST & WIDE SCSI can be achieved by means of ATA disks of 10 MB/s. The operation for reading 2 sectors of different HDDS (in this case HDD 0 and HDD 1) is considered as follows:

a. Issues a read command to HDD 0.
b. Issues a read command to HDD 2.
c. Reads the data of HDDs 0 and 2 one time.
d. Connects the MS to the bus of HDD 0 and transfers it to the host the data sent from HDD 0.
e. Connects the MS to the bus of HDD 2 and transfers it to the host the data sent from HDD 2.
f. Repeats processes (c) to (e) and transfers all the data to the host.

If, in the above operation, processes (d) and (e) are repeated at a cycle of 20 MB/s, it will seem that a HDD of 20 MB/s apparently exists, when viewed from the host.

As has been described herein before, the present invention is such that, by switching the connection of the HDD with two data buses, data transfer can be performed quickly with the minimum necessary number of data buses and writing or reading of data can be performed quickly with a simple configuration.

In addition, in the above-described embodiment, the registers and the control sequencer are incorporated into the DPC 10, and the DPC 10 outputs a CS (control signal) for data transfer by reading or writing from or to the registers using the MCU 32. After the completion of transfer, the DPC 10 generates an interrupt request to the MCU 32 and informs the MCU 32 of the transfer completion. Thus, the DPC automatically performs, in accordance with the indication of the MCU 32, reading and writing of data which take up a large part of the time required in the control of the disk storage device of the this embodiment, so the load associated with the data transfer of the MCU 32 can be reduced. Further, sending or receiving signals to or from the HDD at precise timings is made possible through the DPC 10 by the MCU 32, and the data transfer can be performed quickly regardless of the access of the low-speed HDD. In addition, the HDD can continuously transfer data at optimum timings, so its performance is enhanced. Further, a plurality of HDDs are mapped onto the addresses of the DPC 10 so access to the individual registers can also be simplified.

In this case, when the DPC 10 is viewed from the MCU, it can be considered that the DPC 10 functions as a Direct Memory Access Controller (DMAC). In a point different from a normal DMAC, the DPC 10 corresponds to a "Set Multiple" command and also supports the data transfer which is performed at plural sectors (blocks), so, in the MCU 32, only verifying the data transfer at the time of the completion of block transfer is required. During the data transfer by this DPC 10, the MCU 32 is released from the control of the ATA drive and a load can be assigned to other jobs. It will be understood that other processing means besides the DPC 10 and MCU 32 described above can perform the control functions required by this invention, including general and special purpose microprocessors and microcontrollers.

While it has been described in the above-described embodiment that HDDs 0 and 1 are permanently connected and HDDs 2 and 3 can be connected to the data buses 100 and 200 by means of the multiplexer, the present invention is not limited to this. All of HDDs 0 to 3 may also be constructed so that they can be connected to the data buses 100 and 200 by means of the multiplexer.

In addition, although the embodiment has been described with reference to four HDDs, the present invention is not limited to this but it may also be applied to five or more HDDs.

The disk storage device of this invention has the advantage that, when data is written to or read from each of the hard disks, the writing or reading of data can be performed quickly with a fewer data buses and a simple configuration, because at least one hard disk of a group of hard disks is selectively connected to one of two data buses. Further, because a plurality of hard disks can be selectively connected to one of the data buses, writing or reading of data can be performed without taking into consideration the hard disks permanently connected to one of the data buses, the writing or reading of data can be effectively performed with a fewer data buses, and the writing or reading of data can be performed quickly with a simple configuration.

Writing or reading of data can be performed quickly with two data buses, because new data is written via one data bus to the hard disk and transferred via the same data bus to the parity data generation means and also new parity data generated by the parity data generation means is written via the other data bus to the hard disk. Where all of the hard disks share an address bus, data can be written or read quickly with a simple configuration. And where a the second processing means controls writing or reading of data so that it can be performed in accordance with the indication from the first processing means, the load of the first processing means can be decreased.

We claim:

1. A disk storage device comprising:

two data buses for data transfer, at least one of said data buses further being for parity data transfer, said data buses being capable of synchronous data transfers;

a group of directly controlled hard disks including a plurality of hard disks that can selectively connected to either of the data buses; and including a plurality of hard disks permanently connected to respective ones of the data buses; and control means for selectively connecting the selectively connectable hard disks to a selected one of the data buses in response to a command from a host computer, and for providing control such that data or parity data is written to or read from each of the selectively connectable hard disks synchronously with a data transfer to or from at least one of said permanently connected hard disks.

2. The disk storage device of claim 1, further including a parity data generator for generating new parity data based on written data, written parity data, and new data, and wherein the control means causes: (a) the written data and the written parity data to be simultaneously read and transferred to the parity data generator, (b) the new data to be written via one of the data buses to a one of the hard disks indicated by the command; (c) the new data to be transferred simultaneously from the same one of the data buses to the parity data generator, and (d) new parity data generated by the parity data generator to be written via the other data bus to another one of the hard disks as indicated by the command.

3. The disk storage device of claim 1 further comprising:

an address bus for specifying addresses, said address bus being shared by the group of hard disks; and write and read lines for indicating the writing and reading of data, independent write and read lines being connected to each of the hard disks; and wherein, if the control means writes or reads data to or from one of the hard disks in response to the command, it outputs to the address bus the address corresponding to the command and outputs a control signal to the write and read lines connected to the ones of the hard disks for which writing or reading of data takes place.

4. The disk storage device of claim 1, wherein the control means comprises:

a first processing means for indicating writing or reading of data; and a second processing means for providing control such that data is written or read in accordance with the indication from the first processing means.

5. The disk storage device of claim 4, wherein the first processing means comprises a microcontroller; and wherein the second processing means comprises a data path controller.

6. The disk storage device of claim 1 wherein said directly controlled hard disks are ATA type disk drives.

7. A disk storage device comprising:

two data buses for data transfer, at least one of said data buses further being for parity data transfer, said data buses being capable of synchronous data transfers;

a group of directly controlled hard disks including at least one hard disk that can selectively be connected to one of said data buses, wherein said group of hard disks comprises at least one hard disk connected permanently to one or both of said data buses and at least one hard disk that can be selectively connected to one of said data buses and wherein said data or parity data is written or read synchronously with a data transfer to or from at least one hard disk which is permanently connected to the other of said data buses, and a control means for selectively connecting said at least on hard disk to one of said data buses in response to a command from a host computer and providing control such that data or parity data is written to or read from each of said hard disks.

8. The disk storage device of claim 7 wherein said group of hard disks comprises a plurality of hard disks that can be selectively connected to one of said data buses.

9. The disk storage device of claim 7, further including a parity data generation device for generating new parity data based on written data, written parity data, and new data, wherein said control means provides control such that said written data and said written parity data are read simultaneously and transferred to said parity data generation device, said new data is written via said one of said data buses to a one of the hard disks indicated by said command, said new data is transferred simultaneously from the same said one of said data buses to said parity data generation device, and the new parity data generated by said parity data generation device is written via the other data bus to another one of the hard disks as indicated by said command.

10. The disk storage device of claim 7, wherein each of said group of hard disks shares a single address bus for specifying addresses; and wherein independent write and read lines for indicating the writing and reading of data are connected to each of said hard disks; and wherein, if said control means writes or reads data to or from one of the hard disks in response to said command, it outputs to said address bus the address corresponding to said command and outputs a control signal to the write and read lines connected to at least one of said hard disks for which writing or reading of data takes place.

11. The disk storage device of claim 7 wherein said control means comprises:

a first processing means for indicating writing or reading of data; and a second processing means for providing control such that data is written or read in accordance with the indication from the first processing means.

12. The disk storage device of claim 7 wherein said directly controlled hard disks are ATA type disk drives.

* * * * *